United States Patent Office 2,871,095
Patented Jan. 27, 1959

---

2,871,095

PRODUCTION OF ALUMINA

George L. Hervert, Downers Grove, and Herman S. Bloch, Skokie, Ill., assignors to Universal Oil Products Company, Des Plaines, Ill., a corporation of Delaware No Drawing. Application October 24, 1955
Serial No. 542,462

6 Claims. (Cl. 23—143)

This invention relates to the preparation of alumina, and more specifically to a method of preparing alumina by the interaction of water and metallic aluminum in the presence of an activator selected from the metals in the right-hand column of group IV of the periodic table consisting of germanium, tin and lead.

Alumina, either as the hydrate or as anhydrous aluminum oxide, is widely used in many phases of the chemical and petroleum industries. It has been employed in the petroleum industry as a catalyst for hydrocarbon conversion processes, as a support for catalytically active materials to be used in hydrocarbon conversion processes and as a dehydrating agent. It is widely used in other industries for the same purposes. The activated forms, which are considered to be merely various physical modifications of aluminum oxide, are especially known for their pronounced catalytic activity and adsorptive capacity. The use of alumina as a refractory is also well known. Alumina in the form of corundum has been found suitable for use in the manufacture of certain types of refractory and ceramic materials. In other uses alumina is mixed or composited with other compounds to produce a wide variety of substances with useful properties.

It is an object of our invention to provide a new process for the production of alumina, and further to produce alumina more rapidly and easily than heretofore has been possible.

Alumina or aluminum hydrate is present in various modifications. The more common types of anhydrous alumina are as follows:

Alpha-alumina often known as corundum is the form stable at high temperatures.

Gamma-alumina is very stable but changes to alpha-alumina at temperatures above 1800° F.

Epsilon-alumina is the alumina formed in thin films on the surface of metallic aluminum during oxidation by dry or wet air or oxygen.

The following alumina hydrates or aluminum hydroxides are common or may be prepared in the laboratory.

Gamma-$Al_2O_3.3H_2O$ or gibbsite is prepared by aging boehmite in a cold basic solution.

Alpha-$Al_2O_3.3H_2O$ or bayerite is also formed by aging boehmite in a cold basic solution but is unstable and gradually is transformed into gibbsite.

Gamma-$Al_2O_3.H_2O$ or boehmite may be prepared in a variety of ways, one of the simplest being to add ammonium hydroxide to a water solution of aluminum chloride. The material originally precipitated is thought to be an amorphous alumina flock which rapidly grows in crystal size, yielding crystalline boehmite. Aging boehmite in ammonium hydroxide solution transforms the boehmite first to metastable bayerite and finally to the stable gibbsite.

Alpha-$Al_2O_3.H_2O$ or diaspore occurs abundantly in nature.

In the specification and claims the word alumina will mean one or more of these various modifications, either as anhydrous alumina or alumina hydrate or aluminum hydroxide unless otherwise specifically noted.

By varying the conditions of the process of the invention, several of the various modifications of alumina as hereinbefore described may be obtained. Further, the alumina as prepared by the reaction of water with metallic aluminum may be produced as definite particles such as crystals or in other modifications of the invention the alumina may be prepared as a sol or gel. The alumina may also be present as a slurry and in the slurry it appears that there may be crystals of alumina as well as alumina gel.

The usual commercial method of producing alumina is by purifying ores in which the oxide is present. Another method is by the precipitation of aluminum hydroxide from its salts. The preparation of alumina as at present practiced entails the addition of a basic reagent to a solution of aluminum chloride hexahydrate. The resultant precipitate is washed and filtered to remove undesirable impurities.

When alumina is prepared from the commercially available aluminum chloride hexahydrate, the precipitated alumina requires extensive washing and filtering in order to remove the impurities including excess chloride. The present invention offers a novel method of preparing alumina which eliminates the need for washing and filtration and thereby reduces the time and expense hereinbefore entailed in purifying the alumina.

We have discovered and our invention broadly comprises an improved method of preparing alumina by reacting aluminum with water in the presence of an activator comprising at least 100 weight parts per million (based on the aluminum) of a metal selected from the right-hand column of group IV of the periodic table, consisting of germanium, tin and lead.

In one embodiment the present invention relates to a method for producing alumina which comprises reacting metallic aluminum with water in the presence of an activator comprising a metal selected from the right-hand column of group IV of the periodic table.

In another embodiment the present invention relates to a method for producing alumina which comprises reacting water with metallic aluminum having at least 100 weight parts per million of tin (based on the aluminum) dissolved therein.

In a further embodiment the present invention relates to a process for producing alumina which comprises adding tin to metallic aluminum and subsequently reacting the mixture with water.

In a specific embodiment the present invention relates to a process for producing alumina which comprises dissolving tin in molten aluminum in an amount to produce a mixture containing from about 100 to about 10,000 parts per million of tin (based on the aluminum), forming solid particles from the mixture, and reacting the mixture at a temperature of from about 30° F. to about 705° F. with liquid water in the presence of a catalyst comprising mercury.

Our invention is based on the discovery that tin promotes the reaction between aluminum and water. While tin is the preferred metal to use as an activator or promoter, other metals in the right-hand column of group IV of the periodic table may be used; that is, germanium and/or lead may also be used in the process of the present invention. The metals germanium, tin and lead are characterized as being in the right-hand column of group IV of the periodic table according to Mendeleeff's Periodic Arrangement of the Elements. While tin is the most preferred metal of this group, since it generally produces the best results, it is to be understood that germanium and/or lead may also be used; however not necessarily with equivalent results. The following discussion will be primarily directed to the use of tin; however, again, it is to be understood that germanium and/or lead may also be used.

The tin may be incorporated in the aluminum in any suitable manner. A preferred method, however, is to add tin to molten aluminum. This method is preferred since the aluminum-tin mixture prepared by this method produces best results when used to prepare alumina. The tin may be added to the aluminum before or after it is molten. For example, tin dust particles may be contacted with solid aluminum and then the aluminum heated to above the melting point, or in another method the aluminum is molten and tin dust or tin filings added to the melt. The tin appears to dissolve in the aluminum and upon cooling the tin and aluminum are solidified. The mixture is a homogeneous mixture when this method of preparation is used; however, it is not definitely known how the aluminum and tin are associated in the mixture. There may be some strong physical or chemical bonds existing in the solid mixture or the tin and aluminum may be completely disassociated. Whatever the physical makeup, however, the presence of tin in the aluminum considerably speeds the aluminum-water reaction. Tin oxide or other tin compounds may be used instead of metallic tin, since under the conditions used such materials are reduced by the molten aluminum to tin metal.

The exact role of the tin also is not known. It appears that it is the free tin which is the promoter; however, the tin and aluminum may form a compound which is the actual promoter. Alternatively, the tin may by some means solubilize the surface coating of alumina that is formed by the reaction of aluminum with water causing the alumina to enter into solution and expose more aluminum surface. The tin activator may function to increase the electrochemical reaction by modifying the aluminum to a more easily dissociatable structure or by suppressing the amount of polarization. For example, the tin may cause some internal or intergranular stresses within the aluminum structure thereby rendering the aluminum chemically more reactive.

The tin is preferably used when mercury and/or a mercury compound is also used as a catalyst to accelerate the reaction between the aluminum and water. The tin in such a reaction, that is one in which the reaction is conducted in the presence of a mercury promoter, may have an effect upon the mercury, or the tin may aid in effecting the amalgamation of the aluminum with the mercury. We do not intend to be limited to any of these theories, however, since, as hereinbefore mentioned, the exact role of the tin is not completely known. However, its use greatly effects the speed of the reaction between aluminum and water to form alumina.

The degree of subdivision of the aluminum is another factor determining the rate of the reaction. The smaller the size of the particles, the greater the surface area of aluminum exposed to the water for reaction; a powdered aluminum, if not overly oxidized, is, therefore, excellent. Granulated or pelleted aluminum, or aluminum in ribbon form is also suitable; however, the larger the particle size of the aluminum metal charge, the longer the time required for complete reaction. In general, pellicles of not more than about an inch in greatest dimension are satisfactory, although those of less than about one-half inch average size are preferred. Aluminum pellets prepared by dropping molten aluminum into water have proven to be very satisfactory for producing alumina by the process of our invention.

The epsilon-alumina which forms rapidly on aluminum surfaces and acts as a coating which normally passivates aluminum does not effectively inhibit reaction under the conditions herein disclosed.

One embodiment of the present invention comprises agitating the aluminum-tin mixture and water sufficiently so that the reaction to produce alumina proceeds at a desirable rate. The reaction velocity is dependent upon the temperature of the reactants, the degree of subdivision of the aluminum, and to a limited extent the concentration or amount of tin, and the degree of agitation given the mixture. Thus a reaction that proceeds slowly at a temperature of 212° F. with only a mild agitation or shaking of the mixture will proceed very rapidly if the mixture is vigorously agitated. At a temperature of 572° F., on the other hand, the reaction proceeds relatively rapidly even with a mild degree of agitation. However, if the mixture is subjected to vigorous agitation, the time necessary for complete reaction is substantially decreased.

A preferred embodiment of the present invention relates to a process for producing hydrated alumina which comprises reacting an aluminum-tin mixture with water, agitating the mixture to form alumina, maintaining a pressure sufficient to keep at least a portion of the water in the liquid phase, and separately recovering alumina from the reaction mixture.

It is a desirable feature of the present invention that liquid water be present, and it is thus necessary when temperatures above the boiling point are employed to effect the reaction under sufficient pressure to maintain a liquid phase of water. The critical temperature of water is 705.2° F.; the definition of the critical temperature being that temperature above which a gas cannot be liquefied by pressure alone. It is desirable to use liquid water since it is much easier to have efficient mixing between the aluminum and water accomplished if there is a liquid phase.

The amount of tin used as a promoter appears to be rather critical, especially in the lower limits. We have found that amounts of tin below one hundred weight parts per million, based on the aluminum (that is one hundred weight of tin per million weight of aluminum), do not have a very great accelerating effect on the reaction between the aluminum and water. When at least one hundred weight parts of tin per million (based on the aluminum) is used the tin has a definite accelerating effect. The upper limit is preferably about ten thousand weight parts per million; however, this upper limit does not appear to be as critical as the lower limit. At above ten thousand parts per million of tin, incremental additions of tin do not accelerate the reaction very much and further at above ten thousand weight parts per million (based on the aluminum) the tin is present in the alumina in such great amounts that it may be an undesirable contaminant for some uses of alumina.

The use of tin appears to have some effect on the properties of the alumina produced. For example, when tin is used in amounts of at least one hundred weight parts per million weight parts of aluminum, and the conditions of reaction are such that the alumina is formed as a slurry, the product slurry has a higher filtration rate than when tin is not present. Further, we have found that the resulting alumina powder is capable of being processed into pills of much greater strength than normally obtained with alumina prepared when the amount of tin is below one hundred weight parts per million.

While the reaction between aluminum and water is greatly speeded by the use of tin, the reaction is also greatly accelerated by the use of certain catalytic substances such as bases, acids, mercury and/or mercury compounds and combinations of these various substances. It is preferred that mercury and/or mercury compounds be present in the reaction mixture. When a catalyst, for example, a mercury promoter such as mercuric oxide, is added to the aluminum-water reaction mixture, the reaction is more rapid than if the mercury compound were absent; however, even though the addition of the mercury compound speeds the reaction, the addition of tin to the aluminum still further accelerates the rate of reaction. It is preferred that the reaction mixture consist of aluminum, tin, water and a mercury promoter; however, other catalysts such as bases and/or acids may be used. When the reaction between aluminum and water is effected in an acidic aqueous solution, and the acids are present in only small amounts, a gel is usually produced and when larger amounts of acid are employed a sol is generally produced. For example, to make an alumina sol in the presence of hydrochloric acid, an amount of acid above 0.4 mol per mol of aluminum, and preferably above about 0.65 mol per mol of aluminum, may be used, as compared with the stoichiometric amount of three mols. To make a gel, amounts of acid one-tenth as large as those used for sol formation, or even less, may be used.

For purposes of alumina gel formation suitable mineral acids comprise the mono-basic acids, hydrogen fluoride, hydrogen chloride, hydrogen iodide, hydrogen bromide, nitric acid, etc.; the bi-valent acids, sulfuric acid, etc.; the tri-valent acids, phosphoric acid, etc. Suitable organic acids are the poly-basic acids such as, for example, oxalic acid, malonic acid, succinic acid, maleic acid, phthalic acid, tartaric acid, citric acid, etc. These poly-basic acids result in the desirable gel formation whereas the lower, water soluble mono-basic fatty acids may not. For purposes of gel formation an acid or mixture of acids must be selected in amounts such that the acid anion to aluminum ratio is, in terms of stoichiometric equivalents, as herein set forth. The mono-basic inorganic acids usually produce gels when the ratio of mono-valent acid anion is in amount below 0.13 equivalent of acid anion per equivalent of aluminum, while the bi-valent inorganic acid anion usually is in amounts such that the ratio is below about 0.5. The poly-valent acid anions usually produce gels with a higher ratio of acidic anion of below 1.0 equivalent of acid anion per equivalent of aluminum and even higher; however, ratios below about 1.0 are preferred since ratios greater than 1.0 involve the use of excess free acid anion. For example, sulfuric acid forms gels with $SO_4^=/Al^{+++}$ ratios of below about 0.5 equivalents of acid anion per equivalent of aluminum while the corresponding maximum for $Cl^-/Al^{+++}$ is about 0.13. For gel formation, therefore, the acid is selected from the group consisting of inorganic acids, poly-basic or poly-valent organic acids and acid-acting salts in amounts such that the mono-valent acid anion is below about 0.13 equivalent of acid anion per equivalent of aluminum, the bi-valent inorganic acid anion is below about 0.50, the bi-valent organic acid anion is below about 1.0 and the amount of tri-valent acid anion is below about 1.0. The bi-valent organic acid anions and higher-valent organic and inorganic acid anions form gels above the 0.50 ratio of the di-basic inorganic acids with gels being formed using ratios as high as 5.0; however, ratios much above 1.0 are not preferred since ratios above 1.0 involve the use of excess free acid. Ratios below about 0.01 of any of the acid anions do not usually effectively catalyze the desired reaction.

For purposes of sol formation, suitable inorganic or mineral acids comprise hydrogen chloride, hydrogen iodide, hydrogen bromide, nitric acid, sulfuric acid, etc., or mixtures thereof. The amount of acid or mixtures thereof must be such that the anion/aluminum ratio, in terms of equivalents is at least 0.13 and generally within the range of from about 0.13 to about 0.75. The mono-basic acids produce sols even with the lower ratios within this range, while the bi-valent acids require the higher ratios within this range. For example, sulfuric acid forms sols with $SO_4^=/Al^{+++}$ ratios of above about 0.5 equivalents per equivalent while the corresponding minimum for $Cl^-/Al^{+++}$ is about 0.13. The acids which form alumina sols are those which form water-soluble aluminum salts and have mono-valent or bi-valent anions, and the limiting or lower ratio of anion to aluminum ratio for sol formation (in equivalents of acid anion per equivalent of aluminum) may be broadly given by the formula $$R=(0.13)(4)^{n-1}$$

where $n=$ the valence of the anion (1 or 2). For mono-valent anions, $R=0.13$; for bi-valent, $R=0.52$ or about 0.5. Amounts below this range while possessing sufficient catalytic activity tend to produce alumina gels.

Using different concentration of acids, therefore, produces alumina either as a gel, a sol or crystals of alumina. At temperatures above about 400° F. crystals of alumina are usually produced. The temperature range in which a fluid gel or sol is produced, therefore, is from about 30° F. to about 400° F. although alumina is produced within the broader range of from about 30° F. to about 705° F.

A mercury promoter is preferably added to the water as a promoter or accelerant or catalyst, and it is preferably used in very low concentration. In general, the amount of mercury promoter will usually be within the range of from about 0.05% to about 50% by weight of the aluminum. Concentrations of mercury promoter below this range do not effectively catalyze the reaction, and concentrations above this range often produce undesirable results, for example, the aluminum surface may be so completely amalgamated as to reduce the anodic area sufficiently to decrease the reaction velocity.

The mercury promoter is selected from the following group and may be a mixture of two or more of these mercury promoters: mercury, mercuric acetate, mercurous acetate, mercuric bromate, mercurous bromate, mercuric bromide, mercurous bromide, mercuric bromide iodide, mercurous carbonate, mercuric chlorate, mercuric chloride, mercurous chloride, mercuric fluoride, mercurous fluoride, mercuric iodide, mercurous iodide, mercuric nitrate, mercurous nitrate, mercuric oxalate, mercuric oxide, etc., as well as mercury-nitrogen compounds such as ammono-basic mercuric bromide, ammono-basic mercuric chloride, etc. Almost any other mercury-containing compound may be used and as herein mentioned it may be a mercuric salt, a mercurous salt either organic or inorganic, an oxide of mercury, or a complex of mercury compounds.

Drying the alumina gel at various temperatures produces alumina in various modifications. Drying gibbsite alumina within the temperature range of from about 30° F. to about 400° F. leaves mainly gibbsite alumina. An analysis of the gibbsite alumina dried at 400° F. shows that the product is chiefly gibbsite, however, small amounts of boehmite, a modification of hydrated gamma-alumina, are evidenced. As the temperature of the drying is increased, the percent of boehmite in the product is accordingly increased and at a temperature of approximately 650° F. the product after the drying is analyzed as being almost entirely boehmite.

The reaction of the aluminum-tin mixture with the water, with and without the addition of the mercury promoter, may be effected in any suitable type of equipment wherein the reactants are subjected to agitation and preferably to vigorous stirring. The operation may be carried out in continuous or batch-wise fashion. When temperatures above the normal boiling point of water are employed, and the reaction is performed with water in the liquid phase, it is of course necessary that the reaction vessel be capable of withstanding pressures sufficient to maintain a liquid phase of water. In small scale production of alumina by this process a rotating pressure autoclave is satisfactory. When the temperatures employed are at or below the boiling point of water, the reaction may be effected in ordinary open equipment in which a means is provided for vigorous stirring, agitation or circulation of the reactants. It is, however, necessary that the process equipment be constructed of such material that it is not affected by water or aluminum and/or the promoters used so that undesirable elements are not introduced into the alumina product; however, if the presence of these foreign substances is not objectionable, the above precautions need not be adhered to. Hydrogen is produced by the reaction of the aluminum with the solution and a means of venting must be provided if the pressure build-up caused by the production of this hydrogen is to be avoided. If the equipment will withstand this additional pressure, however, it is not necessary to vent the hydrogen continuously. The amount of hydrogen evolved may be measured by the pressure build-up on the system and/or the hydrogen vented may be passed through a gas meter and the amount evolved measured in this manner.

The tin used as a catalyst remains associated with the alumina and the exact form has not been definitely established. The tin may originally be present as the free metal, but upon exposure to air and water, it probably changes to the oxide.

The following examples are given to further illustrate the novelty and utility of the present invention but not with the intention of unduly limiting the same.

*Example I*

18 grams of aluminum chips approximately 1/16" wide, 1/4" long, and 1/16" thick, having no detectable tin content were utilized in this test. 500 grams of distilled water and 0.40 gram of mercuric chloride were first placed in a 2-liter Pyrex flask equipped with a 6-bladed Pyrex stirrer and heated. When the temperature reached 100° C. the aluminum chips were added. The stirrer was rotated at 1500 R. P. M. Eleven hours were required to effect substantially complete reaction between the aluminum and the water, to form a slurry of alumina in water.

*Example II*

The above experiment was repeated in every detail except in this run aluminum chips having 1800 parts per million of tin were used. Seven and one-tenth hours were required to effect substantially complete reaction of the aluminum with the water.

*Example III*

The experiment as outlined in Example I was again repeated in every detail except in this run aluminum chips having 4400 parts per million of tin were used.

Only three and nine-tenths hours were required to effect substantially complete reaction.

The above examples illustrate that the presence of tin in the aluminum greatly accelerates the reaction between aluminum and water to produce alumina.

We claim as our invention:

1. In the production of alumina by the reaction of metallic aluminum with water, the improvement which comprises reacting the aluminum and water in physical contact with from about 100 to about 10,000 weight parts per million (based on the aluminum) of an activator metal selected from the group consisting of tin, lead and germanium.

2. In the production of alumina by the reaction of metallic aluminum with water, the improvement which comprises reacting the aluminum and water in physical contact with from about 100 to about 10,000 weight parts per million of tin based on the aluminum.

3. In the production of alumina by the reaction of metallic aluminum with water, the improvement which comprises reacting the aluminum and water in physical contact with from about 100 to about 10,000 weight parts per million of tin based on the aluminum and a mercury catalyst in an amount of from about 0.05% to about 50% by weight of the aluminum.

4. The improvement of claim 2 further characterized in that the tin is dissolved in the aluminum.

5. The improvement of claim 1 further characterized in that said activator metal is lead.

6. The improvement of claim 1 further characterized in that said activator metal is germanium.

References Cited in the file of this patent
UNITED STATES PATENTS

| | | |
|---|---|---|
| 2,746,842 | Bloch et al. | May 22, 1956 |
| 2,820,693 | Hervert et al. | Jan. 21, 1958 |

OTHER REFERENCES

Metallic Corrosion Passivity and Protection, Evans, U. R., 2nd edition, 1946, pages XXIV, 7, 8, 249.

Metal Finishing, "Galvanic Corrosion of Aluminum," by Pearlstein, Fred, April 1956, pages 52 to 57.